Patented Nov. 3, 1936

2,059,466

UNITED STATES PATENT OFFICE 2,059,466

AROMATIC IMINO COMPOUNDS AND PROCESS OF MAKING THEM

Otto Limpach, Wiesbaden-Biebrich, and Karl Hager, Frankfort-on-the-Main, Germany, assignors to General Aniline Works, Inc., New York, N. Y., a corporation of Delaware No Drawing. Application January 8, 1935, Serial No. 922. In Germany March 20, 1930

8 Claims. (Cl. 260—109)

The present invention relates to aromatic nitrogen compounds, particularly to alpha-arylamino-naphthalene compounds, and to a process of preparing them.

It is known that many aromatic hydroxy compounds yield with bisulphites, such as alkali or ammonium bisulfites, addition-products which are capable of reacting with aliphatic or aromatic amines. In this manner there are obtained from aromatic hydroxy compounds the corresponding aromatic amino compounds. According to the known process the reaction components (bisulfite + aromatic hydroxy compound + amine) are heated in an aqueous medium under raised or ordinary pressure.

In some cases, for instance, in the reaction of beta-naphthol with phenyl hydrazine, the yield obtained according to the known process is sufficient. In many other cases, however, especially in using alpha-naphthols, it has not been possible, hitherto, to convert by one of the known methods the aromatic hydroxy compounds into the corresponding amino compounds (cf., for instance, Bucherer, Lehrbuch der Farbenchemie, 1921, page 194).

Now, we have found that aromatic amino compounds may be obtained with a very good, in some cases nearly quantitative, yield by causing bisulfite-addition-products of hydroxy compounds of the benzene series or similar addition products of alpha-hydroxy-compounds of the naphthalene and anthracene series to react with amino compounds, preferably at a temperature between about 100° C. and about 200° C. in such a manner that the bisulfite-addition product acts in the form of its free acid upon the amino base. This may advantageously be done by reacting a salt of the amino compound, such as, for instance, its hydrochloride, with an equimolecular quantity of a salt of the bisulfite-addition-product.

All bisulfite-addition-products of the aforesaid hydroxy compounds may be used with advantage as starting materials in the present process. They may be obtained according to known methods or, for instance, by boiling in a reflux apparatus the corresponding hydroxy compounds with 8 to 10 times their weight of bisulfite solution (38–40° Bé.), for instance, for 5–10 hours or longer, while stirring. The addition products crystallize, on cooling, or they may be precipitated by addition of sodium chloride or isolated by any other suitable manner, for instance, by evaporation.

The process may be carried out by separating the bisulfite-addition-product and then heating it in a molecular proportion with the salt of an amino compound to a higher temperature, preferably to a temperature between about 100° C. and about 200° C., it being advantageous to raise the temperature gradually within the said limits. The process may also be performed by causing the bisulfite-addition-product of the aromatic hydroxy compound to react with the salt of the amino compound in the presence of a diluent which boils above 100° C., such as, for instance, chlorobenzene, glycerine, dimethylaniline and others.

It has, furthermore, been found that probably the bisulfite-addition-product of the aromatic hydroxy compound first combines with the amino compound, for instance, according to the following equation:

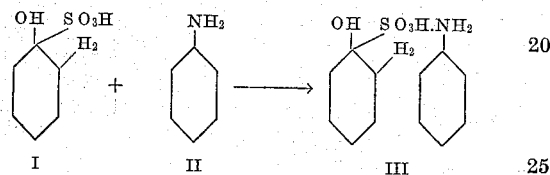

The product III cannot be formed in the presence of bisulfite.

By heating the addition product of the above Formula III to a temperature between about 100° C. and about 200° C. it is immediately transformed into the aromatic amino compound with elimination of $SO_2$ and water. By performing, however, the reaction between the bisulfite addition-product and the salt of the amino compound at lower temperature, for instance, by working in an aqueous solution, it is possible in many cases to separate the salt-like addition product which, when heated, likewise yields the aromatic amino compound.

It is also possible to prepare the bisulfite-addition-products in known manner in an aqueous solution and, without isolating them, to bring them into reaction with the salts of the bases, for instance, aniline-hydrochloride. Care must be taken that the excess of bisulfite is neutralized or removed by means of an acid since, otherwise, too great an excess of the base is necessary; furthermore, it is of advantage in this case that the reaction should occur under raised pressure.

According to this new process, a series of new compounds may be obtained.

The following examples serve to illustrate the invention, but they are not intended to limit it thereto; the parts being by weight:

(1) 264 parts of the addition-product of the following formula:

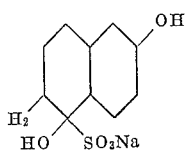

(obtainable by boiling for 5 hours 2.5-dihydroxynaphthalene with bisulfite solution) are mixed with 130 parts of aniline-hydrochloride and melted together at 120° C. to 130° C. With lively elimination of water and sulfur dioxide, the 5-phenyl-amino-2-naphthol is obtained with a yield of 70 percent of the theoretical.

(2) 264 parts of the bisulfite-addition-product of 1.5-dihydroxynaphthalene, obtainable analogously to the method for making the 2.5-derivative referred to in Example 1, are stirred with 191 parts of aniline-sulfate in 1000 parts of aniline at 120° C. to 140° C. until the evolution of sulfur dioxide has ceased; the aniline is then distilled off with steam. The 5-phenylamino-1-naphthol, obtained with a yield of 96.5 percent, is filtered with suction, washed with water and dried.

(3) 264 parts of 2.8-dihydroxynaphthalene-bisulfite are heated to gently boiling with 180 parts of betanaphthylamine-hydrochloride in 900 parts of chlorobenzene until the evolution of sulfurdioxide has ceased; the chlorobenzene is removed by steam-distillation and the 8-beta-naphthyl-amino-2-naphthol thus formed is purified by boiling it with dilute hydrochloric acid; the yield amounts to 84 percent of the theoretical.

(4) 264 parts of the sodium-bisulfite-addition-product of 1.5-dihydroxynaphthalene are heated, while stirring to 130° C. to 150° C. with 128.5 parts of benzidine-hydrochloride in 1200 parts of glycerine until the evolution of sulfur dioxide has ceased; at 90° C. the whole is introduced, while stirring, into 15 times its weight of cold hydrochloric acid of 1 percent strength. The reaction product of the following formula:

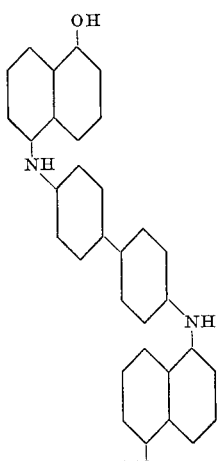

is filtered by suction and washed with water; the yield amounts to 94 percent of the theoretical.

(5) 298 parts of alpha-anthrolbisulfite are stirred with 146 parts of para-aminophenol-hydrochloride in 1200 parts of glycerine for about 2 hours at 130° C. to 160° C. until the evolution of sulfurdioxide has ceased. The whole is introduced, while stirring, at 80° C., into 10 times its weight of hydrochloric acid of 1 percent strength and the 4'-hydroxy-1-phenylaminoanthracene is precipitated thereby; the yield amounts to 82 percent of the theoretical.

(6) 100 parts of resorcin are boiled for 5 hours in a reflux apparatus, while stirring, in 1000 parts of sodium-bisulfite solution. There is formed the addition-product of the formula

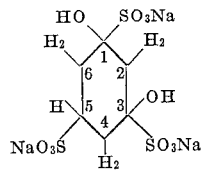

which has become known by Fuchs and Elsner (cf. Berichte der deutschen chemischen Gesellschaft, vol. 53, 1920, page 886). By gradually adding hydrochloric acid and removing the sulfurous acid by continuously boiling, the excess of bisulfite is destroyed; the solution is then cautiously neutralized with caustic soda solution. After addition of the equivalent quantity (260 parts) of aniline-hydrochloride, the reaction product is precipitated by boiling until the evolution of SO2 has ceased. The product which is insoluble in water is filtered with suction, washed with water and dried. The yield amounts to 94.1 percent of the theoretical. It still contains in 5-position the sulfurous acid molecule. The latter may be split off by boiling the product for a short time in water with an excess of caustic soda solution or by heating the dried product to fusing temperature or, better still, by warming the dried product in 5 times its weight of glycerine until the evolution of sulfur dioxide has ceased. (Final temperature about 200° C.). There is thus obtained the known 1.3-di-anilino-benzene, melting at 95° C., with a yield of 81 percent of the theoretical, (calculated upon the resorcin applied).

(7) 31 parts of the sodium salt of the bisulfite compound of 2.8-dihydroxy-3-naphthoic acid are mixed with 16 parts of para-aminoanisol-hydrochloride and the whole is melted in 250 parts of glycerine for ½ hour at 140° C. to 170° C. whereby sulfurous acid escapes vividly. After cooling and dilution with water, there are obtained 25 parts of a light-yellow body of the formula:

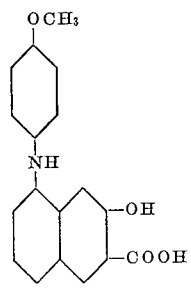

which dissolves in dilute hot sodium carbonate solution, precipitates again on acidification, gives with ferric chloride the reaction typical of ortho-hydroxycarboxylic acids. It couples with diazotized bases and yields dull tints.

(8) A mixture of 30.8 parts of the sodium bisulfite compound of 2.8-dihydroxy-3-naphthoic acid, 13.7 parts of anthranilic acid, 3.74 parts of sulfuric acid of 60° Bé. and 300 parts of glycerine is heated in the course of 40 minutes to 180° C. whereby sulfurous acid is certainly evolved. After cooling, the melt is diluted with water, the precipitate is filtered with suction and purified by dissolving it in dilute sodium carbonate solution and reprecipitating it with hydrochloric acid; it is filtered with suction, washed with hot water and the 8-phenylamino-2-naphthol-3.2'-dicarboxylic acid of the formula:

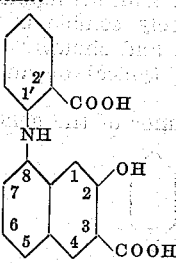

is obtained with a good yield in the form of a yellow-green powder. It dissolves in dilute alkaline aqueous liquids, in alcohol and acetone, is scarcely soluble in xylene and insoluble in water. It shows with ferric chloride the color typical of an o-hydroxycarboxylic acid.

(9) There are used in Example 6, instead of the aniline hydrochloride, 346 parts of m-aniline-sulfonic acid and the whole is boiled until the evolution of $SO_2$ has ceased. The reaction product which separates on cooling and corresponds to the following formula:

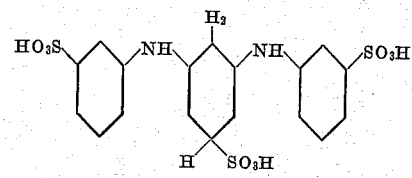

is filtered with suction, washed with a sodium chloride solution of 10 per cent strength and dried. The yield amounts to 70 per cent of the theoretical. It has a feebly yellow color and loses on boiling with dilute caustic soda solution the combined bisulfite.

(10) There are used in Example 6, instead of 260 parts of aniline-hydrochloride, 336 parts of concentrated hydrochloric acid (84 parts=1 mol.) and 100 parts of hydrazine-hydrate are added. The whole is boiled in a reflux apparatus, while stirring, until the evolution of $SO_2$ has ceased. The reaction product which has separated and corresponds to the formula:

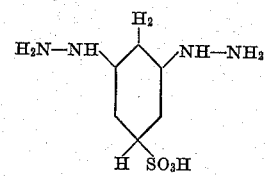

is filtered with suction and washed with cold water. The yield amounts to 75 percent of the theoretical.

The feebly yellow product is nearly insoluble in water, dissolves easily in aqueous alkalies and loses sulfurous acid when boiled with dilute caustic soda solution, or when heated either alone or in a high-boiling solvent; thereby it is transformed into m-phenylene-dihydrazine.

(11) There are used in Example 6, instead of 260 parts of aniline-hydrochloride, 289 parts of phenylhydrazine-hydrochloride and the whole is boiled until the evolution of sulfurous acid has ceased. After cooling, the reaction product of the formula:

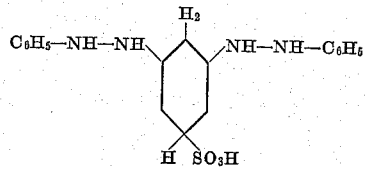

which is scarcely soluble in water is filtered with suction and washed with cold water. The yield amounts to 60 percent of the theoretical.

The gray-yellow product dissolves in aqueous alkalies and loses sulfurous acid when boiled with dilute caustic soda solution, whereby part of the hydrazo body is oxidized to the azo dyestuff by means of air. On heating the product in glycerine to 220° C. sulfurous acid is lost and a product is obtained which is scarcely soluble in many solvents (probably formation of a dicarbazole).

(12) 248 parts of the sodium salt of the bisulfite-addition product of α-naphthol are heated, while stirring, at 130° C. to 150° C. with 146 parts of p-aminophenol-hydrochloride in 1200 parts of glycerine until the evolution of $SO_2$ has ceased; the whole is introduced at 90° C. into 10 times its weight of cold hydrochloric acid of 1 percent strength. The reaction product of the formula:

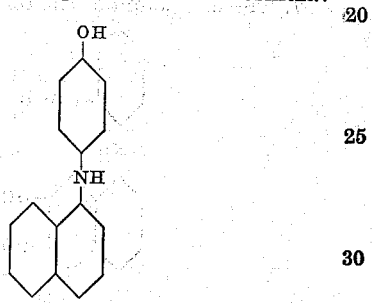

thus formed, is filtered with suction and washed until neutral with water. It melts at 91° C. and is obtained with a yield of 94 percent of the theoretical.

We claim:

1. The process which comprises heating a bisulfite addition product of a hydroxy-compound of the group consisting of hydroxy-benzenes, α-hydroxy-naphthalenes and α-hydroxy-anthracenes with an equimolecular quantity of a salt of an amino compound.

2. The process which comprises heating at temperatures between about 100° C. and about 200° C. in the presence of a diluent a bisulfite addition product of a hydroxy compound of the group consisting of hydroxy-benzenes, α-hydroxy-naphthalenes and α-hydroxy-anthracenes with an equimolecular quantity of a salt of an amino compound the temperature being raised gradually within the above range.

3. The process which comprises heating, while stirring, at a temperature of about 130° C. to about 150° C. in the presence of glycerol the sodium bisulfite addition product of α-naphthol with an equimolecular quantity of the hydrochloride of para-aminophenol until the evolution of $SO_2$ has ceased, the temperature being raised gradually within the above range.

4. The process which comprises melting at a temperature of about 140° C. to about 170° C. for about half-an-hour in the presence of glycerol the sodium bisulfite-addition-product of 2.8-dihydroxy-naphthalene-3-carboxylic acid with an equimolecular quantity of the hydrochloride of para-aminoanisole, the temperature being raised gradually within the above range.

5. The process which comprises heating in the course of about 40 minutes up to about 180° C. in the presence of glycerol a mixture of equimolecular proportions of the sodium bisulfite-addition-product of 2.8-dihydroxy-naphthalene-3-carboxylic acid, anthranilic acid and sulfuric acid.

6. The compound of the formula:

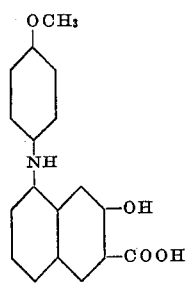

dissolving in dilute hot sodium carbonate solution, precipitating again on acidification, giving with ferric chloride the reaction typical of ortho-hydroxycarboxylic acids, coupling with diazotized bases and yielding dull tints.

7. The compound of the formula:

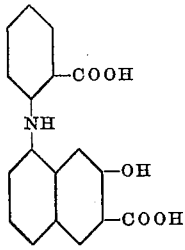

forming a yellow-green powder which dissolves in dilute alkaline aqueous liquids in alcohol and acetone, is scarcely soluble in xylene and insoluble in water, and showing with ferric chloride the dyeing typical of an ortho-hydroxycarboxylic acid.

8. The compounds of the general formula:

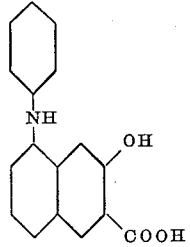

which contain a methoxy group in 4'-position or a carboxylic group in 2'-position.

OTTO LIMPACH.
KARL HAGER.